L. J. MATHSON.
SELF STEERING ATTACHMENT FOR TRACTORS.
APPLICATION FILED DEC. 19, 1921.
1,426,491.
Patented Aug. 22, 1922.
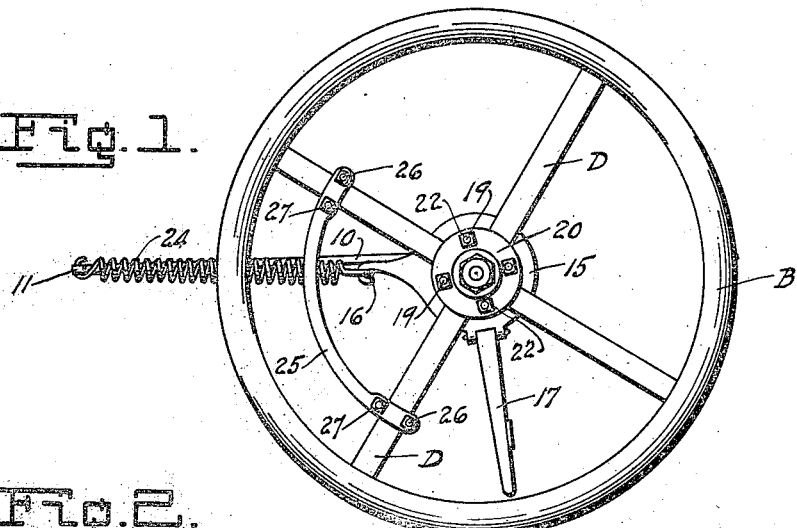
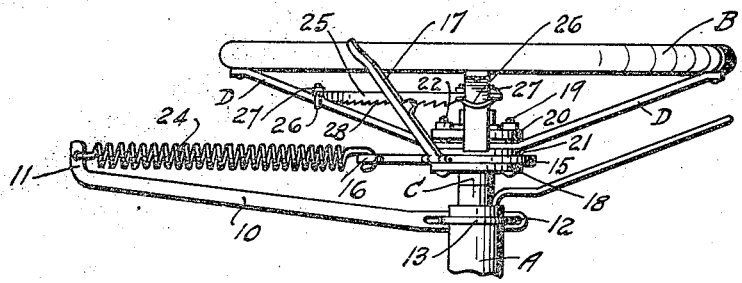
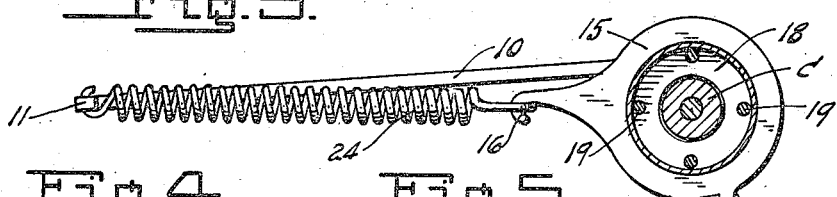
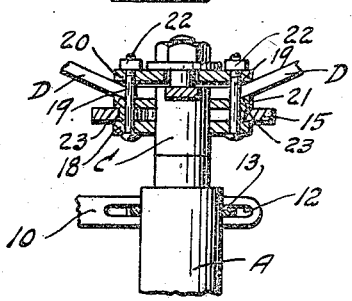
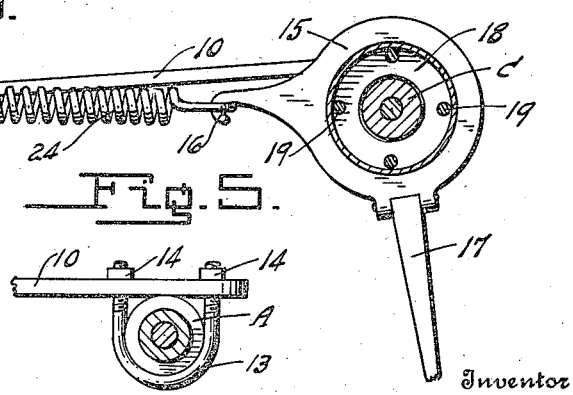
Inventor
Leslie J. Mathson
By Watson E. Coleman
Attorney

UNITED STATES PATENT OFFICE.

LESLIE J. MATHSON, OF BLACK RIVER FALLS, WISCONSIN.

SELF-STEERING ATTACHMENT FOR TRACTORS.

1,426,491.        Specification of Letters Patent.     Patented Aug. 22, 1922.

Application filed December 19, 1921. Serial No. 523,381.

*To all whom it may concern:*

Be it known that I, LESLIE J. MATHSON, a citizen of the United States, residing at Black River Falls, in the county of Jackson and State of Wisconsin, have invented certain new and useful Improvements in Self-Steering Attachments for Tractors, of which the following is a specification, reference being had to the accompanying drawings.

This invention relates to attachments for tractors and has for its object the provision of means associated with the steering wheel of a tractor or the like for holding the wheel against movement and consequently causing the tractor to travel properly in a furrow.

It is well known that the front end of a tractor has a tendency to move away from the furrow wall, due to the fact that the front wheels lean to one side and this makes it necessary for the driver to hold the wheel continually and apply a certain degree of strain thereto in one direction in order to hold the tractor to the furrow. It is with this fact in view that I have designed the present inventon which has for a more specific object the provision of means for applying spring tension to the steering wheel tending to rotate it in one direction so as to counteract the natural inclination of the tractor not to follow a straight path.

An important object is the provision of an attachment of this character in which means is provided for regulating the spring tension in order that the action will be equally as efficient upon a hillside as upon level ground.

Another object is the provision of a device of this character in which the parts will automatically operate to release the spring tension in the event that the operator forgets to effect the release manually at the end of a furrow or in case the front wheels of the tractor strike against an obstruction of such size or of such a nature as might cause damage to the steering mechanism.

An additional object is the provision of a device of this character which will be simple and inexpensive in manufacture, which does not necessitate making any alterations in the construction of the tractor itself, which will be highly efficient in use, positive in action, durable in service and a general improvement in the art.

With the above and other objects and advantages in view, the invention consists in the details of construction to be hereinafter more fully described and claimed and illustrated in the accompanying drawings, in which:—

Figure 1 is a plan view of the device associated with the steering wheel of a tractor;

Figure 2 is a side elevation;

Figure 3 is a horizontal sectional view;

Figure 4 is a vertical sectional view;

Figure 5 is a detail horizontal sectional view.

Referring more particularly to the drawings, the letter A designates the steering column or post and B designates the rotatable steering wheel including the usual hub C from which radiate the spokes D.

In carrying out my invention I provide an elongated bracket arm 10 which has one end upturned, as indicated at 11, and which has its other end formed with a longitudinal slot 12 through which passes a U bolt 13 surrounding the steering post and carrying suitable clamping nuts 14.

Carried by the steering wheel is a ring member 15 which is formed at one side with a hook 16 and which is provided at a spaced point with a pivoted pawl 17 which is spaced from the hook 16 as shown. This ring member 15 is held in association with the steering wheel by means of a washer 18 disposed against its under side and through which pass bolts 19 which pass through the opening in the ring 15. I also provide a washer 20 disposed against the top of the hub C and a disk 21 disposed against the under side of the hub and in engagement with the top of the ring member 15, both the members 20 and 21 being formed with holes for the passage of the bolts 19. It should, of course, be stated that these bolts carry suitable nuts 22 for securing all the parts together. It is preferable that the disk 21 be notched or recessed at intervals, as indicated at 23, for the accommodation of the spokes D of the wheel and the engagement of the spokes within these notches will prevent relative rotation of the members 18, 20 and 21 with respect to the wheel. By this construction it will be seen that the ring member 15 is revoluble with respect to the hub of the wheel.

In order to secure spring tension, I provide a coil spring 24 which has one end connected with the upturned end 11 of the bracket arm 10 and which is adapted to have its other end engaged upon the hook 16.

Carried by two adjacent spokes of the wheel is a segment 25 held in place by U bolts 26 encircling the spokes and carrying suitable nuts 27. The under edge of this segment is formed with ratchet teeth 28 with which cooperates the pawl 17.

Assuming that the device has been constructed and installed as above described, the operation is as follows: The operator first pulls upon the slotted arm 10 to place the spring 24 under a slight degree of tension, the amount of tension being variable and being controllable by virtue of the provision of the elongated slot 12 through which passes the U bolt 13 and it is apparent that the nuts 14 may be tightened to maintain such adjustment. The operator then engages the free end of the spring upon the hook 16 and turns the steering wheel to the proper position to insure straight ahead travel of the tractor regardless of its tendency to turn away from the wall of the furrow. When the wheel has been turned to this extent the operator swings the pawl 17 upwardly into engagement with the teeth 28 after which he may discontinue holding the wheel. The tension of the spring operates to hold the pawl 17 in engagement with the ratchet teeth and it will be apparent that the tractor will then follow a straight path under ordinary conditions. If however, the front wheels should strike against a stone or other obstruction of such a size or nature as might cause injury to the steering mechanism and the front wheels are turned to the right, the resultant rotation of the steering wheel to the right will cause the hook 16 to disengage the spring 24, thus rendering the attachment inoperative. If the front wheels are turned to the left when striking such an obstruction, the resultant rotation of the steering wheel to the left will counteract the tension holding the pawl 17 in engagement with the teeth 28 and the pawl will then drop into inoperative position. The same result occurs if the operator should forget to disengage the pawl 17 manually upon reaching the end of a furrow. In this way it will be seen that in case of undue strain the device will automatically be thrown to the inoperative position so as to avoid breaking any of the parts.

From the foregoing description and a study of the drawings it will be apparent that I have thus provided a simply constructed and easily operated device which may be installed upon the steering wheel of a tractor without necessitating any alterations in the tractor, the device efficiently acting to hold the steering wheel under tension for counteracting any natural tendency of the tractor to depart from its proper path in a furrow. It is to be noted that the spring tension is generally adjustable by means of the slotted bracket arm and that it is locally and specifically adjustable by means of the pawl and segment whereby to vary the tension to meet any and all conditions regardless of whether the tractor is being run upon level ground or upon a hillside.

While I have shown and described the preferred embodiment of the invention it is, of course, to be readily understood that I reserve the right to make such changes in the form, construction and arrangement of parts as will not depart from the spirit of the invention or the scope of the sub-joined claims.

Having thus described my invention, I claim:

1. In combination with the steering wheel of a tractor, a member rotatable with respect to the wheel and provided with a hook and a pivoted pawl, a notched segment carried by the wheel with which said pawl cooperates, and a spring having one end secured to a stationary element of the tractor and having its other end detachably connected with said hook.

2. In combination with the steering wheel of a tractor, a member rotatably mounted with respect to the hub thereof, a spring having one end secured stationarily and having its other end detachably connected with said member at the periphery thereof, a toothed segment carried by the steering wheel, and a pivoted pawl carried by said member and engageable with a selected notch of said segment.

3. A device of the character described comprising the combination with the steering wheel of a tractor, of a ring member rotatably associated with the hub of the steering wheel and formed at one side with a hook and provided at a spaced point with a pivoted pawl, means for holding said ring member in association with the steering wheel while permitting relative rotation, an adjustable spring having one end stationarily mounted and having its other end detachably engaged upon said hook, and a retaining element carried by the wheel and with which said pawl may be engaged.

4. A device of the character described comprising the combination with the steering wheel of a tractor, of a ring member rotatably associated with the hub of the steering wheel and formed at one side with a hook and provided at a spaced point with a pivoted pawl, means for holding said ring member in association with the steering wheel while permitting relative rotation, an adjustable spring having one end stationarily mounted and having its other end detachably engaged upon said hook, and a retaining element carried by the wheel and with which said pawl may be engaged, said retaining element consisting of a segment carried by the spokes of the wheel and provided in its under face with teeth of ratchet shape.

5. In combination with the steering wheel and post of a tractor, a bracket arm adjustably mounted upon the steering post, a ring member rotatably mounted with respect to the hub of the steering wheel and formed with a hook, a locking pawl pivoted upon said ring member, a spring having one end secured to said bracket arm and having its other end detachably engaged upon said hook, and a segment carried by the steering wheel and provided with ratchet teeth engageable by said locking pawl.

6. In combination with the steering wheel of a tractor, spring means detachably connected with the wheel tending manually to rotate the wheel in one direction, means for varying the tension of the spring means, and means for effecting release of the tension in case the front wheels of the tractor strike an obstruction.

In testimony whereof I hereunto affix my signature.

LESLIE J. MATHSON.